United States Patent [19]

Erickson, Jr.

[11] Patent Number: 4,640,697
[45] Date of Patent: Feb. 3, 1987

[54] VACUUM CLEANER CONSTRUCTION
[75] Inventor: Roy O. Erickson, Jr., Cadillac, Mich.
[73] Assignee: Rexair, Inc., Troy, Mich.
[21] Appl. No.: 782,509
[22] Filed: Oct. 1, 1985
[51] Int. Cl.$^4$ .......................................... B01D 47/02
[52] U.S. Cl. ..................................... 55/248; 55/406; 55/472; 15/353
[58] Field of Search ................ 55/248, 276, 406, 472; 15/353, 413

[56] References Cited

U.S. PATENT DOCUMENTS

| 2,221,572 | 11/1940 | Brock et al. | 55/248 |
| 2,534,808 | 12/1950 | Bevington et al. | 55/472 |
| 2,648,396 | 8/1953 | Kirby | 55/400 |
| 2,886,127 | 5/1959 | Brock | 183/37 |
| 2,945,553 | 7/1960 | Brock | 183/24 |
| 2,954,095 | 9/1957 | Brock | 183/22 |
| 4,138,761 | 2/1979 | Nauta | 15/353 |
| 4,226,575 | 10/1980 | Hyatt et al. | 417/423 A |

Primary Examiner—Bernard Nozick
Attorney, Agent, or Firm—Harness, Dickey & Pierce

[57] ABSTRACT

The present invention discloses a liquid bath vacuum cleaner having a cooling air stream separated from its cleaning air stream to improve the cooling efficiency of the vacuum cleaner. The separation of the air streams accomplished by a construction comprising a pan assembly, a main housing detachably connected to the pan assembly, a cap assembly connected to the housing, a motor assembly mounted within the cap assembly including a drive motor, a separator for drawing cleaning air into the vacuum cleaner, and a sealing mechanism to form a cleaning air cavity or pathway through the vacuum cleaner and a separate cooling air cavity for cooling air for the drive motor.

8 Claims, 1 Drawing Figure

VACUUM CLEANER CONSTRUCTION

BACKGROUND AND SUMMARY OF THE INVENTION

The present invention relates to vacuum cleaners, more particularly to liquid bath vacuum cleaners. In the past liquid bath vacuum cleaners have mixed motor cooling air and cleaning air during the cleaning process. Examples of prior art are U.S. Pat. Nos. 2,886,127, 2,945,553, and 2,954,095, illustrating different embodiments of liquid bath vacuum cleaners. All embodiments show the mixing of cooling air and cleaning air during the cleaning process. Applicant has determined that the cooling of the drive motor from the vacuum cleaner can be improved with separation of the cooling air from the cleaning air. Thus, a need in the field has existed to separate the cleaning air stream from the motor cooling air stream to alleviate the mixing of these air streams and improve the cooling of the drive motor along with increasing the life of the motor by this increased cooling efficiency.

Accordingly, it is a primary object of the present invention to separate the cleaning air from the cooling motor air to improve the cooling efficiency of the vacuum cleaner cooling the drive motor. Another object of the present invention is improved sealing between the cleaning air and cooling air portions of the vacuum cleaner to maintain driven cooling air.

To achieve the foregoing objects, the present invention provides a liquid bath vacuum cleaner which generally comprises a water pan, a main housing assembly, cap assembly, motor assembly, a fan assembly, means for separating the suction air from the cooling air, and a separator. The water pan assembly has a socket, acting as a suction end, for connection to a conventional cleaning hose. Cleaning air including dirt and dust particles enters the water pan assembly which contains a predetermined amount of liquid and the dirt and dust particles are separated from the air. The dust and dirt particles remain in the liquid and the cleansed air passes through the separator, through the fan assembly, and into the main housing cavity, and exits into the ambient air through a plurality of apertures in the main housing assembly wall.

The separate motor cooling air is drawn into the cap assembly by the motor fan. The cooling air circulates around the motor assembly to cool the motor assembly, passes through a gap in the inner canister into the cap assembly cavity, and exits into the ambient air through a plurality of apertures in the cap assembly wall. Thus, the cooling air stream and cleaning air stream are separated to eliminate the possiblity of combining contaminants with the air cooling the motor.

Additional advantages and features of the present invention will be apparent from the subsequent description and the appended claims taken in conjunction with the accompanying drawings.

DETAILED DESCRIPTION OF THE PREFERRED EMBODIMENT

Figure 1:
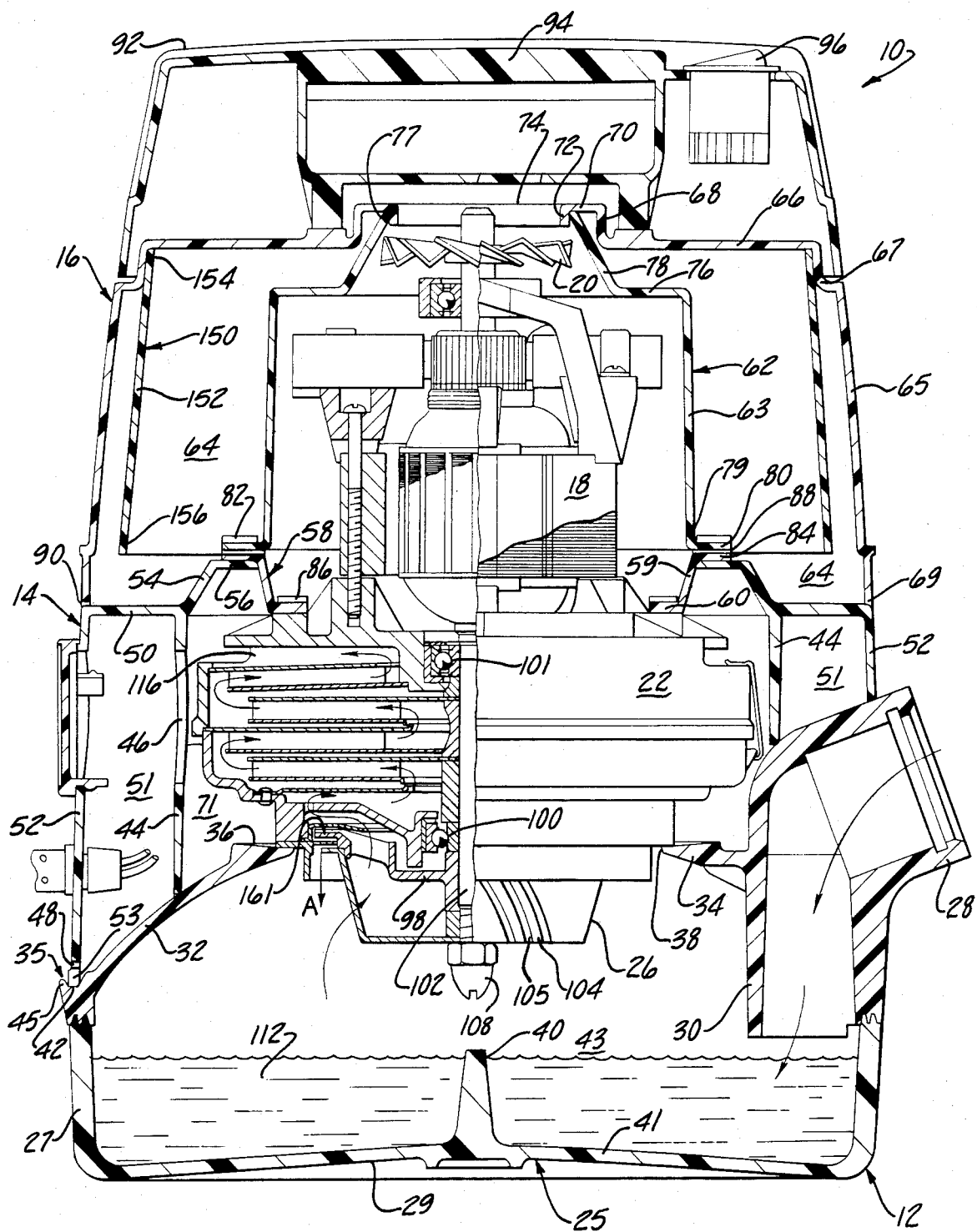
FIG. 1 is a side elevational view partially in a cross-section of the present invention.

Referring to FIG. 1, a partial cross-sectional view of a vacuum cleaner 10 according to the present invention is shown. The vacuum cleaner 10 generally comprises a water pan assembly 12, a main housing assembly 14, a cap assembly 16, a motor assembly 18 and fan 20, a fan and stage housing assembly 22, a motor gasket (not shown), and a separator 26. The motor assembly 18 and fan 20 are mounted within the cap assembly 16, the fan and stage housing assembly 22 is mounted within the main housing assembly 14, and the separator 26 is mounted adjacent to the fan and stage housing assembly 22 and disposed within the water pan assembly 12, when the water pan assembly is operably associated with the main housing assembly 14. The water pan assembly 12 is detachably connected to the main housing assembly 14 by conventional means, such as the latch mechanism, not shown, comprising a plurality of latches around the circumference of the main housing assembly 14. The main housing assembly 14 is detachably connected to the cap assembly 16 by suitable fasteners (not shown).

The water pan assembly 12 has an overall cylindrical, inverted bowl shape design. A circular plate portion forms the base 25 of the pan assembly 12. The base 25 has a concave outer surface 29 and a protrusion 40 at the apex of its inner surface 41. The protrusion 40, acting as a liquid level indicator, extends from the base 25 a desired length. A continuous outer wall 27 forms the cylindrical portion of the pan assembly 12. A second wall portion 32, extending radially inward from the outer wall 27, forms the inverted bowl portion of the pan assembly 12.

A flange 34, positioned on the depending end of the wall portion 32, forms a circular opening 38 in the pan assembly 12. The flange 34 has a flat planar surface 36 for mounting the motor gasket on the pan assembly 12. The opening 38 enables passage of the separator 26 into the pan assembly cavity 43.

A securing means 35 is formed at the intersection of the outer wall 27 and the second wall portion 32. The securing means 35 positions the main housing assembly 14 upon the pan assembly 12. The securing means 35 comprises a ledge 42 and retaining ring 45. The ledge 42 is on a line substantially perpendicular to the outer wall 27. The width of the ledge 42 is sufficient to nest the main housing assembly 14 upon the outer wall 27. The retaining ring 45 is a continuous projection adjacent to the ledge 42 for trapping the main housing outer wall 52 in the ledge 42.

A socket 28 is formed in the outer wall 27 of the water pan assembly 12. The socket 28 provides a suction inlet for drawing cleaning air into the pan assembly 12. The socket 28 has an overall cylindrical shape for easy adaptation of a conventional hose to the pan assembly 12. A throat portion 30 is adjacent to the socket 28. The throat portion 30 acts as a backstop for directing the cleaning air towards the base 25 of the pan assembly 12. Thus, as cleaning air enters into the vacuum cleaner 10, at the socket 28, it is directed by the throat 30 towards the base 25 of the pan assembly 12.

The main housing assembly 14 has an overall concentric cylinder design. A continuous outer wall 52 forms the outer concentric cylinder of the main housing 14. A second inner wall 44 forms the inner concentric cylinder of the main housing 14. A radially inward flange 50 connects the outer wall 52 with the inner wall 44 at the top of the main housing assembly 14. The free depending end 53 of the outer wall 52 nests in the ledge 42 of the pan assembly 12. The inner wall 44, being sufficiently shorter than the outer wall 52, nests upon the outer surface of the inverted wall portion 32 of the pan assembly 12. A cutout portion enables the inner wall 44 to be in contact with the outer surface of the socket 28 and throat 30 portions of the pan assembly 12. A second cutout portion enables the outer wall 52 to be in contact with the outer surface of the socket 28 and throat 30 portions of the pan assembly 12.

The inner wall 44 surrounds the fan and stage housing assembly 22. An aperture 46, in the inner wall 44, provides a passage for cleaning air passing out of the fan and stage housing assembly 22 into the main housing assembly cavity 51. The cleaning air then exits the cavity 51 through a plurality of scallops 48, in the outer wall 52, into the ambient air.

The radially inward flange 50 has a desired width forming a cavity 51 between the outer and inner walls of the main housing assembly 14. An annular flange 54 extends from the radial flange 50 towards the cap assembly 18. A second radially inward flange 56 extends from the annular flange 54. The second radial flange 56 has a flat surface for mounting a support ring 58 to the main housing assembly 14.

The cap assembly 16 has an overall cylindrical design. A continuous outer wall 65 forms the outer casing of the cylindrical cap assembly. The outer wall 65 has its free depending end 69 in a nesting relationship with the main housing assembly 14. The top of the cap assembly 16 is defined by an annular flange 67 extending from the outer wall 65, a radially inward flange 66 extending from the annular flange 67, a second annular flange 68 extending from the radial flange 66, a second radially inward flange 70 extending from the second annular flange 68, and a lip 72 depending from the second radially inward flange 70. The second radial flange 70 and lip 72 forms an opening 74 in the cap assembly 16. The opening 74 provides a pasageway for cooling air into the cap assembly.

An inner canister 62, having an overall cylindrical shape, surrounds the motor assembly 18 and is mounted within the cap assembly 16. A continuous wall 63 forms the cylindrical portion of the inner canister 62. A radially outward flange 80 extends from the wall's free depending end 79. The flange 80 nests upon a mounting support ring 58 and the flange 56 for securing the inner canister 62 and mounting support ring 58 to the main housing assembly 14. A radially inward flange 76 extends from the other end of the wall 63. An annular flange 78 extends from the radial flange 76 having its extended end 77 in a nesting relationship with the radial flange 70 and lip 72.

An inner baffle 150, having an overall cylindrical shape, surrounds the inner canister 62 and is preferably mounted on the cap assembly 16. The inner baffle 150 has a continuous wall 152 which has a top portion 154 and button portion 156. The top portion 154 is secured to the cap assembly 16 by the annular flange 67 by conventional means, such as a friction fit, adhesives, or conventional fasteners. The bottom portion 156 of the wall 152 freely depends into the cavity 64. The inner baffle 150 enhances the baffling effects of the inner canister 62 further eliminating motor noise.

A cavity 64 is formed between the cap assembly 16 and inner canister 62. The cavity 64 may be filled with an insulating material to enhance the baffling effects of the inner canister 62 further eliminating motor noise.

The support ring 58 has an annular wall 59, a radially inward flange 60, and a radially outward flange 84. The annular wall separates the main housing assembly inner cavity 71 from the inner canister cavity 61. The radially inward flange 60 acts as a mounting surface for securing the fan and stage housing assembly 22 to the support ring 58. A clamp ring 86 is positioned on the interior surface of the flange 60 for enabling the securing of the support ring 58 to the fan and stage housing assembly 22 by conventional means. The radially outward flange 84 acts as a mounting surface for securing the support ring to the main housing assembly 14 and inner canister 62. The flange 84 is sandwiched between the flanges 80 and 56. A clamp ring 82 is positioned on the exterior surface of the flange 80 for enabling the securing of the inner canister 62 and support ring 58 to the main housing assembly 14 by conventional means.

A gap 88 is formed between the flange 80 and the support ring flange 84 for providing a passageway for the cooling air to pass from the inner canister into the cavity 64. The cooling air then exits the cavity 64, through a plurality of slits 90, in the cap assembly, to the ambient air.

The cap cover assembly 92 has an overall cylindrical design and is secured to the cap assembly 16 by conventional means. The cap cover assembly 92 provides a handle 94 for carrying the vacuum cleaner 10. A switch 96 is mounted on the cap cover assembly 92 for activation of the vacuum cleaner 10.

FIG. 1 illustrates a cross-section of the fan and stage housing and motor assemblies 22 and 18. The detailed description of the fan and motor assemblies are desribed in Applicant's co-pending application entitled "Improved Air Blower Assembly for Vacuum Cleaners", U.S. patent application Ser. No. 782,510, filed Oct. 1, 1985 and herein incorporated by reference. The fan and stage housing assembly 22 is housed in the inner wall 44 of the main housing assembly 14. The fan and stage housing assembly 22 is supported on the pan assembly 12 by a motor gasket. The fan and stage housing assembly 22 has circular disc design, such that when the fan and stage housing assembly 22 is mounted to the support ring flange 60, the fan and stage housing assembly 22 acts as a sealing means between the main housing assembly 14 and the cap assembly 16.

A spider 98, mounted on a shaft 102 adjacent to the fan and stage housing assembly 22, and a sealed bearing 100, mounted on a shaft 102 within the fan and stage housing assembly 22 and adjacent to the spider 98, seal the fan and stage housing assembly 22 from liquid and liquid vapors disposed in the pan assembly 12. The spider 98 and sealed bearing 100 are in close contact with the shaft 102, thus effectuating a watertight seal and positive pressure labyrinth seal between the shaft 102 and the fan and stage housing assembly 22. The fan and stage housing assembly 22 has a second sealed bearing 101 mounted in close contact with the shaft 102, within the fan and stage housing assembly 22, and adjacent to the motor assembly 18, effectuating an airtight seal between the fan and stage housing assembly 22 and motor assembly for further maintaining separation of the cooling air stream from the cleaning air stream.

The positive pressure labyrinth seal is indicated by arrow A. The seal is formed by a plurality of vanes (not shown) cut into or projecting from the extending radial tip 161 of the spider 98. As the spider 98 rotates, the air at the radial tip 161 is forced outwardly, as indicated by arrow A, into a labyrinth groove formed between the fan and stage housing assembly mounting ring and the spider 98 and separator 26. The positive pressure outward air flow is due to the design of the vanes. The air flows outwardly around the periphery of the separator 26 sealing the fan and stage housing assembly 22 from liquid and liquid vapors contained in the pan assembly 12.

The separator 26 has a plurality of blades 104 and inlets 105 on its outer surface for directing the air inside the water pan assembly 12. The separator 26 is mounted on the shaft 102 by an acorn nut 108. The separator 26 depends into the cavity 43 of the water pan assembly 12. As the separator 26 rotates, the dust and dirt particles are collected through the socket 28 and forced into the liquid while the cleaning air is drawn into the fan and stage housing assembly 22 between the blades 104.

The motor gasket has a ring shape, surrounds the flange 34 of the water pan assembly 12, and is of a resilient material, preferably rubber. A lip formed on the gasket protrudes into the water pan assembly 12 for further sealing the fan and stage housing assembly 22 and main housing assembly 14 from the water pan assembly 12.

Cleaning air enters the pan assembly 12 through the socket 28. The throat portion 30 directs the cleaning air into the liquid 112 in the pan assembly 12. The separator 26, already in rotation, directs the dirt and dust particles into the liquid 112 while drawing the cleaning air into the fan and stage housing assembly 22. The cleaning air is drawn into the fan and stage housing assembly 22, passes through a plurality of fan stages 114, and then passes out of the fan and stage housing assembly 22 through a plurality of apertures 116. The cleaning air then enters the main assembly inner cavity 71, passes through the inner wall opening 46 into the main housing assembly cavity 51. The cleaning air then exits the cavity 51 through a plurality of scallops 48, in the main housing 14, into the ambient air.

The cooling air enters the cap assembly through opening 74 into the inner canister 62 to cool the motor assembly 18. The cooling air exits through the gap 88 into the cap assembly cavity 64. The cooling air then exits the cap assembly 16 through a plurality of slits 90 into the ambient air. Thus, the cooling air is separated from the cleaning air in the present invention throughout operation of the vacuum cleaner 10.

While it will be apparent that the preferred embodiments as illustrated herein are well calculated to fill the objects of the above stated, it will be appreciated that the present invention is susceptible to modification and variation without changing from the scope and spirit of the present invention.

What is claimed is:

1. A liquid bath vacuum cleaner comprising a pan assembly adapted to contain a liquid bath including inlet means for enabling ingress of cleaning air into said vacuum cleaner and having an outer wall and a wall extending radially inwardly from said outer wall forming an opening at the top of the pan assembly, a main housing operably associated with said pan assembly, said main housing including a main housing cavity including outlet means for enabling egress of cleaning air from said main housing cavity and said vacuum cleaner, a cap assembly operably associated with said main housing, said cap assembly including a cap assembly cavity, an inner canister positioned within said cap assembly, a motor assembly mounted within said inner canister, baffle means positioned within said cap assembly and surrounding said inner canister for reducing vacuum noise while enabling cooling air to pass through said cap assembly cavity, means for drawing cooling air into said cap assembly associated with said motor, means for enabling cooling air to egress from said inner canister into said cap assembly cavity, means for enabling cooling air to egress from said cap assembly cavity and said vacuum cleaner, means for dividing said main housing assembly from said cap assembly including an opening, means for separating said main housing cavity from said cap assembly cavity, said separating means including a support ring associated with and secured to said dividing means, and a fan housing assembly, including a fan, positioned within said main housing cavity and associated with and secured to said support ring at said dividing means opening, means for establishing a seal between said fan housing assembly and said radially inwardly extending wall, and a separator for drawing cleaning air into said pan assembly and separating said cleaning air from liquid droplets.

2. A liquid bath vacuum cleaner as in claim 1 wherein a shaft depends from said motor assembly, said shaft rotating said fan and said separator.

3. A liquid bath vacuum cleaner as in claim 2 wherein a positive pressure seal is formed around said separator for sealing said fan housing assembly from liquid and liquid vapors contained in said pan assembly.

4. A liquid bath vacuum cleaner as in claim 3 wherein a sealed bearing means is mounted on said shaft within said fan housing assembly adjacent to said motor assembly for sealing said fan housing assembly from cooling air disposed in said cap assembly.

5. A liquid bath vacuum cleaner comprising a pan assembly adapted to contain a liquid bath including an inlet for enabling ingress of cleaning air into said vacuum cleaner and having an outer wall and a wall extending radially inwardly from said outer wall forming an opening at the top of the pan assembly, a main housing assembly removably connected to said pan assembly, said housing assembly having an outer wall, a concentric wall having an opening, a wall extending radially inwardly from said outer wall having a radially inwardly flange including an opening, and an outlet for enabling egress of cleaning air from said main housing cavity and said vacuum cleaner, a cap assembly operably associated with said main housing, said cap assembly including a cap assembly cavity, an inner canister positioned within said cap assembly, a motor assembly mounted within said inner canister, means for drawing cooling air into said cap assembly associated with said motor, means for enabling cooling air to egress from said inner canister into said cap assembly cavity, means for enabling cooling air to egress from said cap assembly cavity and said vacuum cleaner, means for separating said main housing assembly cavity from said cap assembly cavity, said separating means including a support ring associated with and secured to said radially inward flange of said main housing assembly, and a fan housing assembly, including a fan, positioned within said main housing cavity and associated with and secured to said support ring at said radial flange opening, said concentric wall extending between said support ring and said radially inwardly wall, means for establishing a seal between said fan housing assembly and said pan assembly radially inwardly extending wall, and a separator for drawing cleaning air into said pan assembly and separating said cleaning air from liquid droplets.

6. The liquid bath vacuum cleaner as in claim 5 wherein a shaft depends from said motor assembly, said shaft rotating said fan and said separator.

7. The liquid bath vacuum cleaner as in claim 6 wherein a positive pressure seal is formed around said separator for sealing said fan housing assembly to constrain water vapors from entering said canister.

8. The liquid bath vacuum cleaner as in claim 7 wherein a sealed bearing means is mounted on said shaft within said fan housing assembly adjacent to said motor assembly for sealing said fan housing assembly from said cooling air and said inner canister.

* * * * *